United States Patent [19]
Coleman

[11] Patent Number: 5,595,657
[45] Date of Patent: Jan. 21, 1997

[54] RECYCLABLE PHOTOGRAPHIC FILTERS

[75] Inventor: Stuart M. Coleman, 37 Bellbird Cres., Blaxland 2774 NSW., Australia

[73] Assignees: Stanley D. Sandler; Stuart M. Coleman, both of New South Wales, Australia

[21] Appl. No.: 563,870

[22] Filed: Nov. 29, 1995

Related U.S. Application Data

[63] Continuation of Ser. No. 276,206, Jul. 18, 1994, abandoned.

[30] Foreign Application Priority Data

Mar. 7, 1994 [AU] Australia .................................. PM4279

[51] Int. Cl.$^6$ .................................................. B01D 29/15
[52] U.S. Cl. .................... 210/461; 210/484; 210/497.01; 55/515
[58] Field of Search .............................. 354/298; 55/502, 55/503, 504, 512, 513, 515, 527; 210/232, 282, 448, 452, 459, 460, 461, 484, 485, 497.01, 508

[56] References Cited

U.S. PATENT DOCUMENTS

| | | | |
|---|---|---|---|
| 5,006,242 | 4/1991 | Sato et al. ................................ | 210/232 |
| 5,015,375 | 5/1991 | Fleck ......................................... | 210/232 |
| 5,211,846 | 5/1993 | Kott et al. .................................. | 55/502 |
| 5,279,733 | 1/1994 | Heymans ................................. | 210/485 |
| 5,344,559 | 9/1994 | Van Ooijen ............................. | 210/232 |

*Primary Examiner*—W. L. Walker
*Attorney, Agent, or Firm*—Abelman, Frayne & Schwab

[57] ABSTRACT

A recyclable filter cartridge for use in photographic processing has a main tubular housing 11 that encases a core in which a synthetic fiber filtering material 17 is located. The core is accessed by elongated slots 15, 16 formed circumferentially in an outer shell 14 of the housing 11. The slots 15, 16 allow entry of photographic processing chemicals into the core so that, under the influence of an external pump, the processing chemicals may pass through and be filtered by the filtering material 17. There is a tubular outlet 19 for exit of the filtered processing chemicals from the core and for their passage to a processing tank 35. The cartridge may be disassembled by disconnection of a stem tube 12 from the main tubular housing 11 so as to allow manual removal of the used filtering material 17 from the core and the replacement within the core of clean filtering material.

10 Claims, 2 Drawing Sheets

RECYCLABLE PHOTOGRAPHIC FILTERS

This application is a Continuation application under 37 C.F.R. 1.62 of prior application Ser. No. 08/276,206, filed on Jul. 18, 1994, now abandoned.

FIELD OF THE INVENTION

The present invention relates to recyclable filters and, in particular, to recyclable photographic filters for use in photographic processing. More particularly, the present invention relates to photographic filter cartridges that operate by core filtration whereby a filtering material is located in a flow path for the processing chemicals through the filter cartridge core.

BACKGROUND OF THE INVENTION

Conventional photographic processing methods have employed filter cartridges that depend for their filtration on the passage of processing chemicals through the porous outer wall of the cartridge itself. As the outer wall is an undetachable, integral component of these cartridges, the ultimate fouling or blocking of the porous wall through use will necessitate disposal of the entire cartridge.

The cost and waste disposal problems associated with the frequent disposal of conventional photographic filter cartridges has stimulated the need for recyclable filter cartridges.

It is one object of the present invention to provide a filter cartridge that serves as a housing for a filtering material, the filtering material being located in the core of the cartridge and being removable therefrom at the end of its filtering life, without needing to dispose of the cartridge.

It is another object of the present invention that the filter cartridge provides a flow path for the material to be filtered through the core of the cartridge.

BRIEF SUMMARY OF THE INVENTION

According to one aspect of the invention there is provided a recyclable filter cartridge for use in photographic processing, said cartridge comprising:

a housing having a core through which processing chemicals are adapted to pass, entry port means for the ingress of processing chemicals to the core of the housing, exit port means for the egress of processing chemicals from the core of the housing, and filtering material located in the core between the entry and exit port means for filtering processing chemicals, the filtering material being adapted for removal from the core.

Preferably, the housing has a substantially tubular wall, and the core is located therewithin.

Preferably, the cartridge includes means for connection to a recirculating chemical filtering system, whereby the housing core is within the recirculating flow path of the filtering system.

The connection means may be a threaded tubular portion located along the flow path downstream of the filtering material, the threaded portion being adapted for screwable attachment to a similarly threaded access means for a processing tank.

Preferably, the threaded tubular portion is externally threaded.

In a preferred form, the entry port means comprise elongated slots through the tubular wall of the housing.

Preferably, the slots are elongated in a circumferential direction around the tubular wall.

Preferably, the exit port means comprises a tubular opening defined at one end of the tubular wall. It is preferred that the tubular opening is externally threaded.

The filtering material is preferably synthetic fibre.

According to another aspect of the invention there is provided a method of filtering photographic processing chemicals comprising passing the said processing chemicals through the aforementioned recyclable filter cartridge.

According to a further aspect of the invention there is provided a recirculating chemical filtering system which includes the aforementioned recyclable filter cartridge.

BRIEF DESCRIPTION OF THE DRAWINGS

In order that the invention may be more readily understood and put into practical effect, reference will now be made to the accompanying drawings, in which.

DETAILED DESCRIPTION OF THE INVENTION

Figure 1:
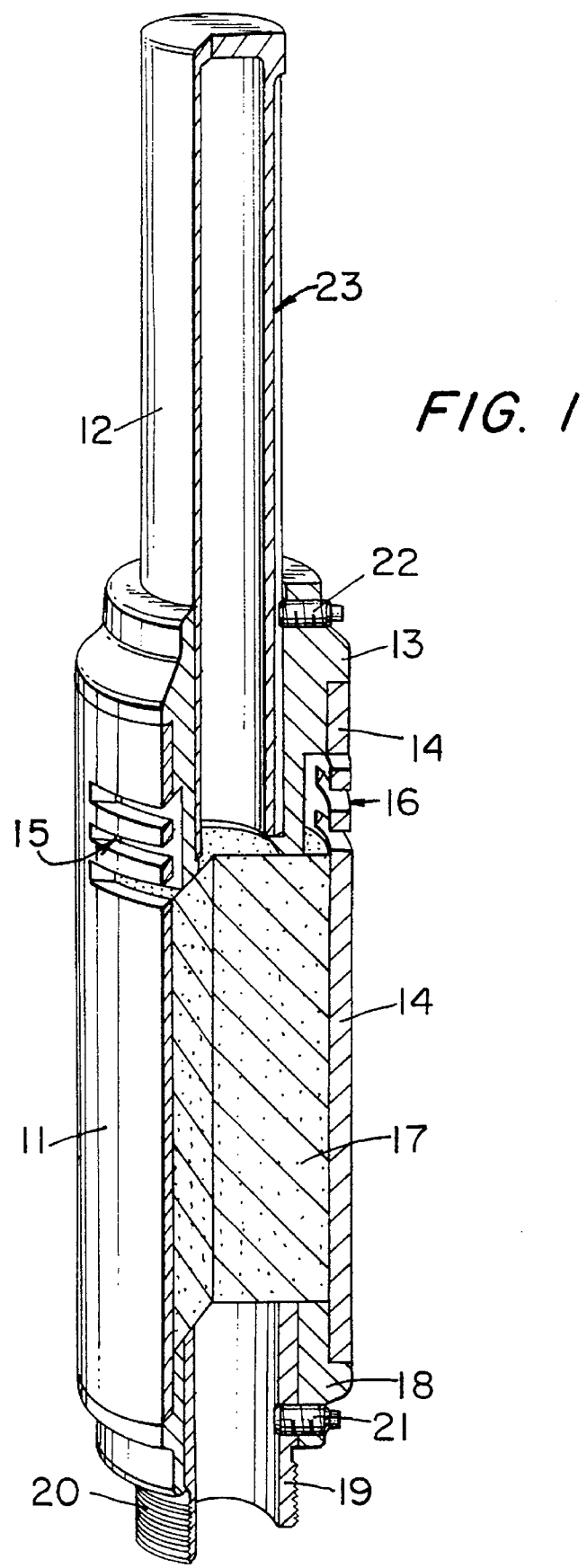
FIG. 1 is a partly sectional side view of a recyclable filter cartridge according to a preferred embodiment of the invention.

The recyclable filter cartridge shown in FIG. 1 includes a substantially tubular housing 11. Connected to the upper part of the housing 11 is a stem tube or handle 12. The stem tube may have a lower threaded portion which screwably engages a threaded bore portion of the housing 11. In another embodiment, the stem tube 12 may be fixed to the housing 11 by adhesive.

In the present embodiment, the stem tube 12 fits into the stepped bore of an upper sleeve 13 which forms the upper part of the housing 11. The sleeve 13 also has an outer stepped portion that receives the upper end of the shell 14 of the housing 11.

The shell 14 has two sets 15 and 16 of three parallel elongated slots arranged circumferentially therearound. Located tightly within the core of the shell 14 below the slots 15, 16 is a synthetic fibre filtering material 17.

At the lower end of the housing 11 is a lower sleeve 18 which also has an outer stepped portion that receives the lower end of the shell 14.

A tubular portion 19 is sealed to the inside of the sleeve 18 so that the combined effect of the sleeve 18 and tubular portion 19 is to stably hold the filtering material 17 in the housing core. The tubular portion 19 has a lower part 20 that is externally threaded and can be screwably connected to a similarly threaded access means for a processing tank or a mount for the housing (see FIGS. 2 and 3).

A threaded member 21 engages aligned screw apertures in both the lower sleeve 18 and tubular portion 19 so as to set the location of the tubular portion 19 with respect to the lower sleeve 18. The tubular portion 19 may have a longitudinal groove that can receive the threaded member 21 at a plurality of locations therealong, thereby accommodating the connection of differently dimensioned tubular portions to the housing 11. A similar threaded member 22 engages an aperture in the upper sleeve 13 and a groove 23 in the stem tube 12 so as to accommodate the connection of differently sized stem tubes.

The slots 15, 16 serve as entry port means for processing chemicals to pass into the core of the housing 11. Once in the core, the processing chemicals pass downwardly under influence of a recirculation pump (see FIGS. 2 and 3) through the filtering material 17 and are then pumped out of the cartridge via the tubular portion 19 which serves as exit port means from the core.

Apart from the tight packing of the filtering material 17 in the core between the upper and lower sleeves 13 and 18, the filtering material 17 may be restricted from moving down through the core by a stop pin or the like mounted diametrically across the lower part of the core between opposed sides of the sleeve 18 or tubular portion 19. A mesh screen may also be used to maintain the filtering material in consolidated form.

In use, the cartridge of FIG. 1 is upright with the stem tube 12 uppermost. A recirculation pump (shown in FIGS. 2 and 3) operates to pass processing chemicals inwardly through the slots 15 and 16 so that they may enter into the core of the housing 11. The processing chemicals then pass through the synthetic fibre filtering material 17 which filters out from the processing chemicals stream any undesirable particles and the like. Under the action of the recirculation pump, the filtered processing chemicals then pass out of the cartridge via the tubular portion 19.

When it is apparent that the filtering material 17 has outlived its filtering effectiveness, the cartridge may be removed from its mount in the reservoir housing, drained of processing chemicals and the stem tube 12 removed from the body of the cartridge. The used filtering material 17 may then be removed from the core by passing a rod or the like therethrough so that the rod presses against the filtering material 17 and urges it out from the housing 11. The core may then be refilled with clean filtering material and the cartridge reassembled to its functional state.

Depending on the circumstances, the used filtering material may optionally be treated to cleanse filtered impurities therefrom and to allow some reuse of the filtering material. Alternatively, the used filtering material may be discarded as waste, although it should be noted that the volume of waste generated by discarding used filtering material employed in the cartridge of the present invention is significantly less than the waste generated by discarding used prior art systems.

Figure 2:
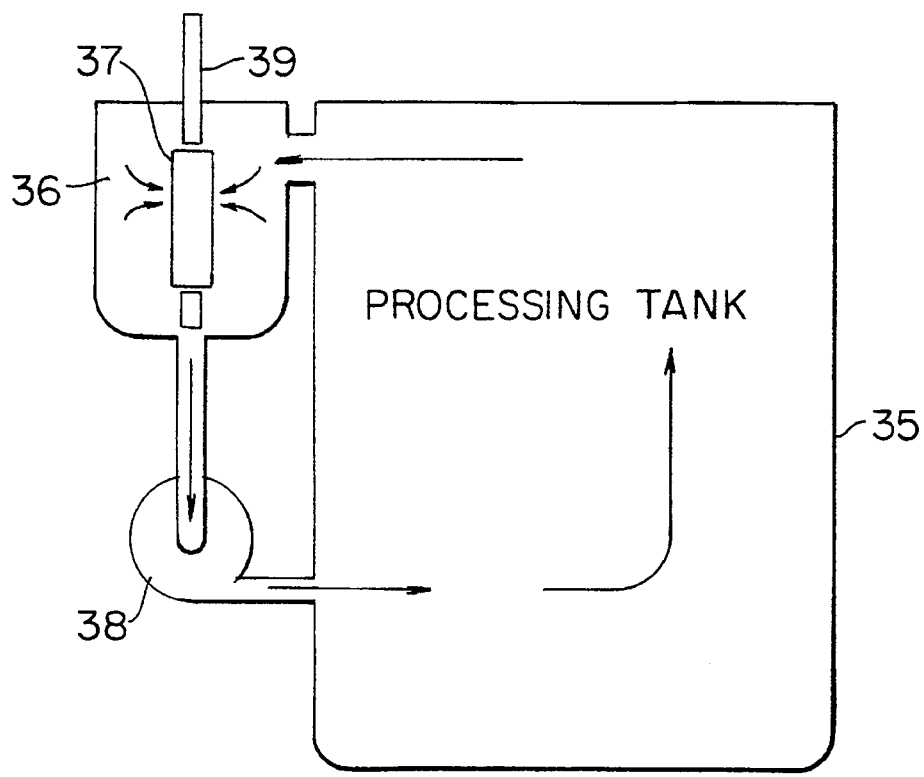
FIG. 2 is a schematic diagram of an open filtering system using a recyclable filter cartridge similar to that of FIG. 1.

Turning now to the diagram of the open filtering system shown in FIG. 2, the arrows show the path of the processing chemicals being circulated from the processing tank 35, to the reservoir housing 36 for the cartridge 37 (similar to the cartridge of FIG. 1), through the cartridge to the pump 38 and back to the processing tank 35.

Figure 3:
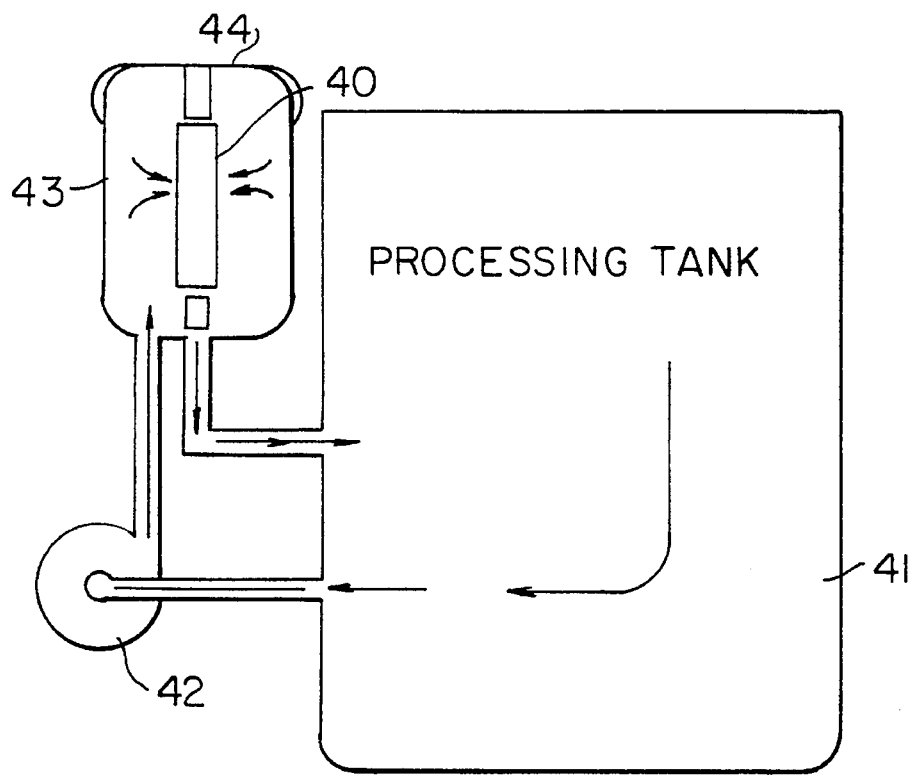
FIG. 3 is a schematic diagram of a sealed filtering system using a recyclable filter cartridge similar to that of FIG. 1.

The sealed filtering system shown diagrammatically in FIG. 3 also uses a cartridge 40 similar to that shown in FIG. 1. The arrows identify the recirculating path of the processing chemicals from the processing tank 41 to the pump 42, and then to the reservoir housing 43. The reservoir housing 43 is sealed by a lid 44 and the processing chemicals pass through the cartridge 40 in the manner as earlier described where they are filtered and then passed back to the processing tank 41.

Various modifications may be made in details of design and construction without departing from the scope or ambit of the invention.

I claim:

1. A recyclable filter cartridge for use in photographic processing, said cartridge comprising:

a housing including a substantially tubular imperforate shell having a longitudinal axis, the shell defining a cylindrical core therewithin through which processing chemicals are adapted to pass from a first end of the core to a second end of the core in the direction of the longitudinal axis of the shell;

entry port means formed through the shell solely at said first end of said core for the ingress of processing chemicals into the housing, the entry port means being in liquid flow communication to the first end of the core;

exit port means defined by an open end of the housing at said second end of said core for the egress of processing chemicals from housing, the exit port means being in liquid flow communication to the second end of the core; and, filtering material which fills and is tightly packed within the cylindrical core extending between the said first and second ends for filtering processing chemicals, whereby the processing chemicals are subject to filtration by passage in the direction of the longitudinal axis of the shell through the filtering material, the filtering material being removable from the core.

2. The cartridge of claim 1 wherein the housing is substantially tubular.

3. The cartridge of claim 2 wherein the exit port means comprises a tubular opening defined at one end of the tubular housing.

4. The cartridge of claim 3 wherein the said one end of the tubular housing is externally threaded.

5. The cartridge of claim 1 wherein the cartridge includes means for connection to a recirculating chemical filtering system defining a recirculating flow path so that the housing core is in liquid flow communication with said recirculating flow path of the filtering system.

6. The cartridge of claim 5 wherein the connection means is a threaded tubular portion located along the flow path downstream of the filtering material, and wherein the threaded tubular portion is screwably attachable to a similarly threaded access means for a processing tank.

7. The cartridge of claim 6 wherein the threaded tubular portion is externally threaded.

8. The cartridge of claim 1 wherein the entry port means comprises elongated slots through the wall of the housing.

9. The cartridge of claim 8 wherein the slots are elongated in a circumferential direction around the wall.

10. The cartridge of claim 1 wherein the filtering material is synthetic fibre.

* * * * *